L. SLOOP.
DIRIGIBLE AUTOMOBILE LAMP.
APPLICATION FILED JUNE 21, 1918.

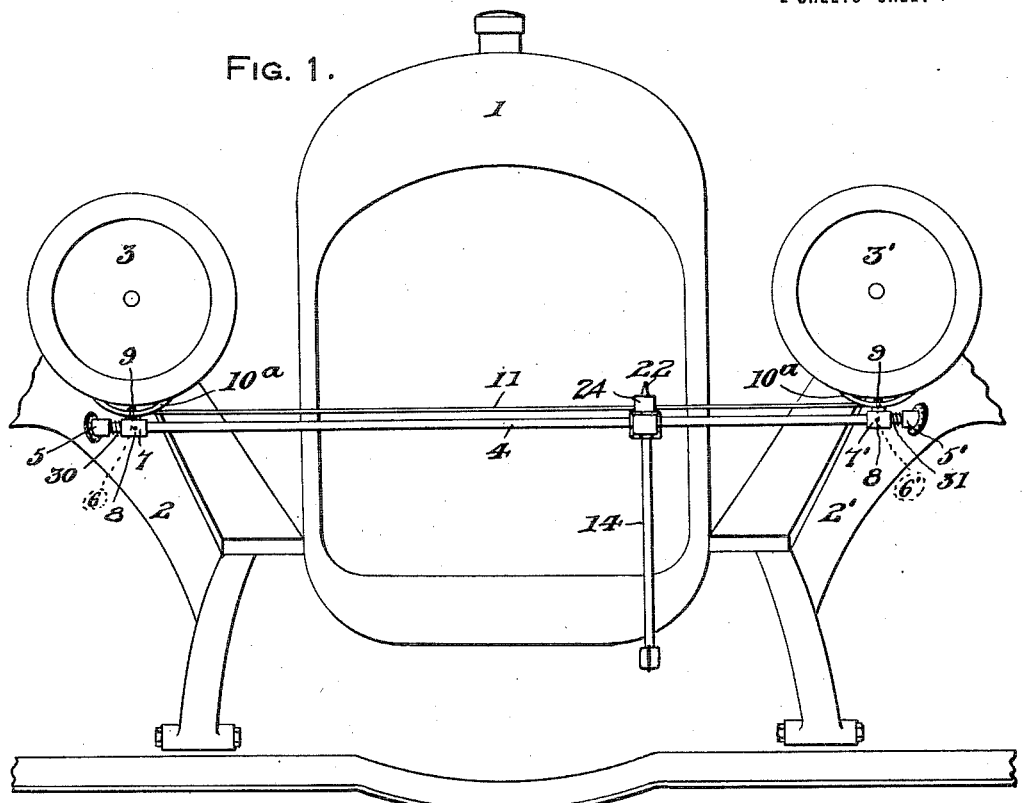
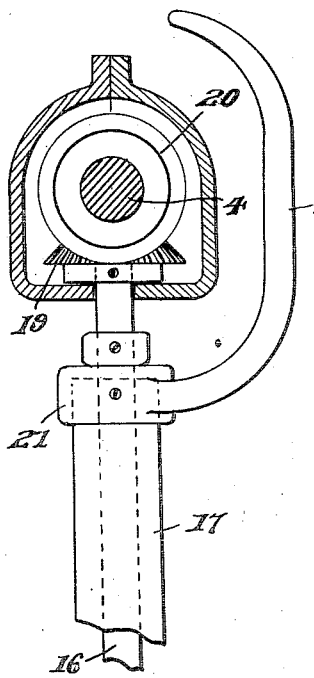
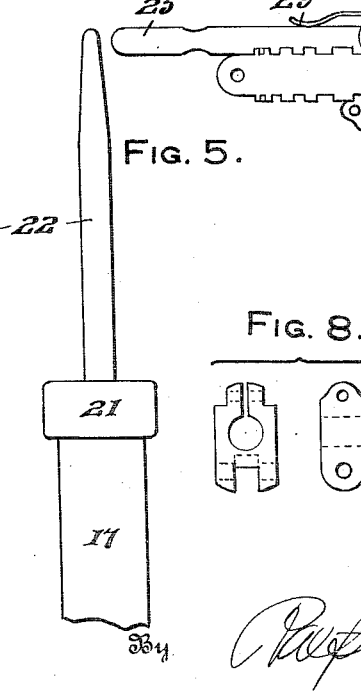
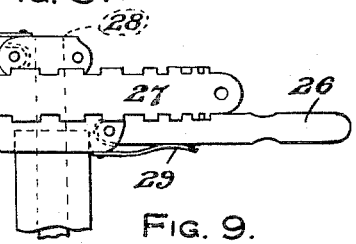

1,319,630.

Patented Oct. 21, 1919.
2 SHEETS—SHEET 2.

Inventor
L. Sloop

By Ralph T. Bassett
Attorney

UNITED STATES PATENT OFFICE.

LEONIDAS SLOOP, OF FINDLAY, OHIO.

DIRIGIBLE AUTOMOBILE-LAMP.

1,319,630.  Specification of Letters Patent.  Patented Oct. 21, 1919.

Application filed June 21, 1918. Serial No. 241,137.

*To all whom it may concern:*

Be it known that I, LEONIDAS SLOOP, a citizen of the United States of America, residing at Findlay, in the county of Hancock and State of Ohio, have invented certain new and useful Improvements in Dirigible Automobile-Lamps, of which the following is a specification.

This invention relates to certain new and useful improvements in dirigible automobile lamps.

The principal object of this invention is to so construct and arrange the lamps of an automobile or other vehicle that by means of a simple movement of levers suitably located on the dashboard, they may be readily elevated, lowered or swung in a horizontal plane at the will and convenience of the driver.

Another object of this invention is to arrange for the vertical movement of the lamps to such a degree as to enable the operator to project the rays of the lamps downwardly to such an extent as to effect a satisfactory dimmer, and to provide operating mechanism by which this result can be obtained instantaneously.

Other objects will be obvious by reference to the following specifications and claims and particular reference to the drawings forming a part of this specification herein like numerals of reference designate corresponding parts throughout the several views in which:—

Figure 1 is a front elevation of a portion of an automobile provided with my invention;

Fig. 3 is an elevational view of the operating lever mechanism for the headlights;

Fig. 4 is an enlarged view partially in section of the controlling connections for the headlight mechanism;

Fig. 5 is a rear elevation of a portion thereof;

Figs. 8 and 9 are detail views of split collars employed with the controlling levers.

Figure 2:
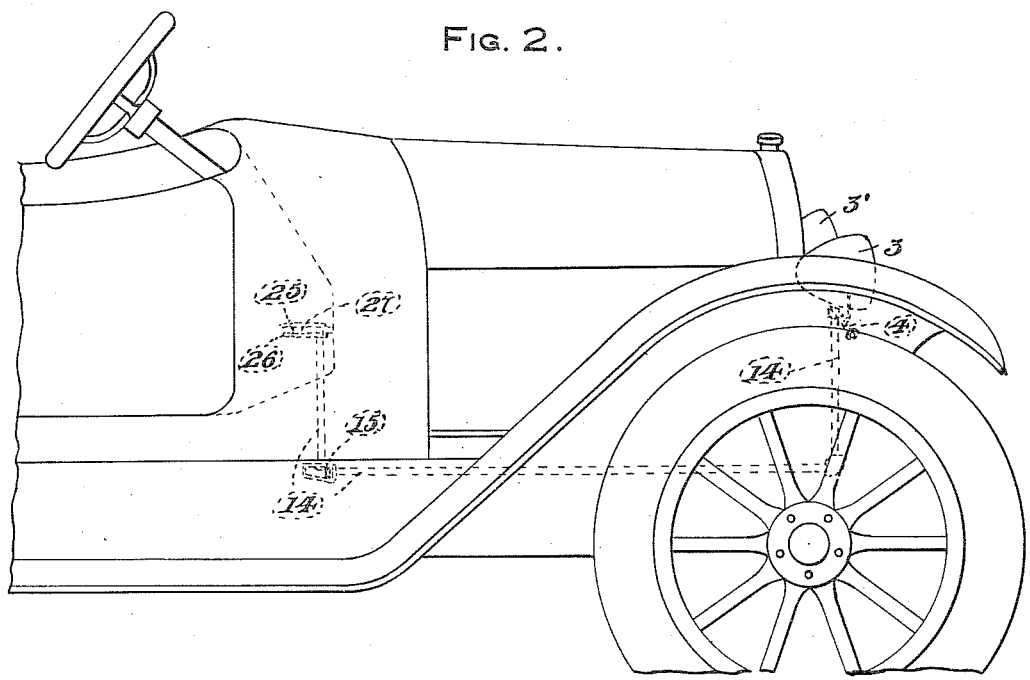
Fig. 2 is a side elevation thereof.
Figure 6:
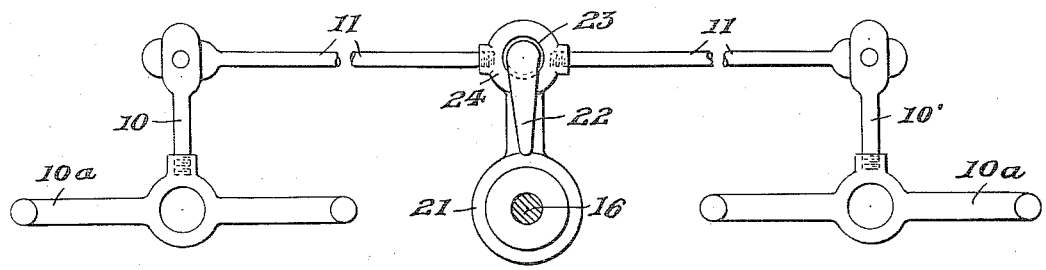
Fig. 6 is a top plan view of the lamp holding means with parts broken away.
Figure 7:
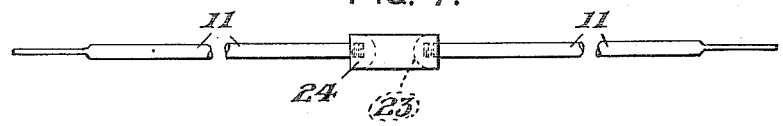
Fig. 7 is a view of the turnbuckle means employed.

Reference numeral 1 indicates the conventional automobile provided with the usual mudguards 2, 2'. Lamps 3, 3' are shown supported on the transverse shaft 4. The transverse shaft 4 is mounted in the bearings 5, 5', shown in the preferred form carried by the mudguards 2, 2'.

It will be seen that the lamp supports 10ª employ the studs 6, 6' formed integral with the collars 7, 7', which latter are secured in position on the said shaft by means of the set-screws "8." The upper extremities of the studs are screw-threaded and provided with nuts as shown at "9" for the purpose of holding the lamps in position. Rods 10, 10' are threaded into the rear of the said collars and these rods are connected by the turnbuckle arrangement shown at "11."

The operating mechanism comprises the series of concentric shafts "14" provided with suitable meshing gears "15" at their respective joints and connections. The outer extremity of the inner shaft "16" is provided with bevel gear "19" which meshes with the bevel gear "20" on the said transverse shaft "4." The upper extremity of the outer shaft "17" is provided with a cap "21" and is fixed in place either by means of screw-threads or set-screws as may be preferred. A horn-shaped member "22" is formed integral with the said cap and projects upwardly around the gearing and through the aforesaid turnbuckle, the opening in which latter is beveled inwardly from both top and bottom, as shown at "23" and "24" to allow for the arc movement of the said turnbuckle during the movement of the said lamps as will more clearly hereinafter appear.

Operating levers "25" and "26" are shown connected to the inner ends of the said concentric shafts and are adapted by means of the fixed notched segment "27," secured to the dashboard of the said vehicle to enable the ready operation of the shafts. It will be seen that these levers are pivoted as at "28" and are provided with springs "29" which cause the ready engagement of the same with the notches in said segment.

At "30" and "31" are shown spiral springs arranged on the said transverse shaft "4." The extremities of these springs engage the bearing and the stud collars respectively and keep the said transverse shaft "4" in normal position.

Any suitable forms of gear casings may be provided and in the present illustration are shown casings of shapes bent to closely inclose the gearings.

In instances where the mud-guards or other features of the vehicle will not warrant the mounting of the bearing as illustrated suitable supporting means may be provided as shown in the modified form in Fig. (1) and connected to the most advisable portion of the framework of the machine.

The operation of the device is as follows: Where it is desired to utilize the device as a dimmer or for purposes of examining the road directly ahead of the vehicle, the driver will by the movement of the lever connected to the inner shaft, cause the lamps to swing upwardly or downwardly through the connecting shafts and gearing which connect the said lever to the gearing on the said transverse shaft. Should the driver desire to swing the lamps on their vertical axis and thereby project the light to the right or the left of the road or machine, the lever connected to the outer shaft is operated and the horn member which is formed integral with the cap aforesaid, is thereby caused to swing to the right or left. This movement of the horn member causes the turn-buckle and connecting means to move transversely swinging the lamps as desired on their vertical axis. Numerous changes in details of construction and manner of operating may be made without deviating from the spirit of the invention, although it will be seen by one versed in the art that the mechanism shown produces accurately and satisfactorily the result desired.

What I claim as new and useful and desire to secure by Letters Patent is—

1. The combination of a vehicle, a transverse shaft, bearings carried by said vehicle, said shaft being mounted in said bearings, upwardly projecting studs carried by said shaft, lamps, mountings for said lamps, said lamp mountings being mounted on said studs for horizontal rotation, operating means for rotating said transverse shaft in its bearings to tilt said lamps including a vertical shaft geared to said transverse shaft, means connecting said lamps independently of said transverse shaft, a rotary casing for said vertical shaft, and an upright horn-shaped projection carried by the upper extremity of said casing and having a loose sliding and pivotal engagement with said lamp connecting means to cause horizontal rotation of said lamps on said studs and to allow tilting of the lamps upon rotation of said transverse shaft.

2. The combination of a vehicle having mudguards, a transverse shaft, bearings carried by said vehicle mudguards, said shaft being mounted in said bearings, upwardly projecting studs carried by said shaft adjacent said mudguards, lamps, mountings for said lamps, said lamp mountings mounted on said studs for horizontal rotation, operating means for rotating said transverse shaft in its bearings to tilt said lamps including a vertical shaft arranged between the lamps and geared to said transverse shaft, means connecting said lamps independently of said transverse shaft, a rotary casing for said vertical shaft, and an upright rearwardly curved horn-shaped projection carried by the upper extremity of said casing and having a loose sliding and pivotal engagement with said lamp connecting means to cause horizontal rotation of said lamps on said studs and to allow tilting of the lamps upon rotation of said transverse shaft.

LON SLOOP.